United States Patent
Shaffer et al.

(10) Patent No.: US 6,826,159 B1
(45) Date of Patent: Nov. 30, 2004

(54) SYSTEM AND METHOD FOR PROVIDING SPEAKER IDENTIFICATION IN A CONFERENCE CALL

(75) Inventors: Shmuel Shaffer, Palo Alto, CA (US); Michael Edmund Knappe, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/578,538

(22) Filed: May 24, 2000

(51) Int. Cl.[7] .................. H04Q 11/00; H04M 3/42
(52) U.S. Cl. ............. 370/260; 379/202.01; 379/245; 379/207.01; 370/259; 370/263
(58) Field of Search ................ 379/142.01, 142.04, 379/142.16, 202.01, 242, 245, 247, 205.01, 207.01; 370/259, 260, 263, 264; 709/204

(56) References Cited

U.S. PATENT DOCUMENTS

| | | | |
|---|---|---|---|
| 5,127,001 A | | 6/1992 | Steagall et al. |
| 5,206,886 A | | 4/1993 | Bingham |
| 5,483,588 A | * | 1/1996 | Eaton et al. ........... 379/202.01 |
| 5,812,534 A | * | 9/1998 | Davis et al. ................ 370/260 |
| 5,889,764 A | | 3/1999 | Needham et al. |
| 5,914,940 A | | 6/1999 | Fukuoka et al. |
| 6,011,782 A | * | 1/2000 | DeSimone et al. ......... 370/260 |
| 6,078,658 A | * | 6/2000 | Yunoki ....................... 379/220 |
| 6,125,108 A | * | 9/2000 | Shaffer et al. .............. 370/259 |
| 6,192,395 B1 | * | 2/2001 | Lerner et al. ............... 709/204 |
| 6,275,575 B1 | * | 8/2001 | Wu ........................ 379/202.01 |
| 6,298,062 B1 | * | 10/2001 | Gardell et al. ............. 370/401 |
| 6,327,567 B1 | * | 12/2001 | Willehadson et al. ....... 704/270 |
| 6,353,660 B1 | * | 3/2002 | Burger et al. .......... 379/201.11 |
| 6,457,043 B1 | * | 9/2002 | Kwak et al. ................ 709/204 |

OTHER PUBLICATIONS

Patent Application entitled: "System and Method for Supporting Conferencing Capabilities Over Packet–Switched Networks" filed Oct. 21, 2000, inventors: Jan Fandrianto and Sam Sin, claims priority to U.S. Provisional patent application Ser. No. 60/161,168 filed on Oct. 22, 1999.

* cited by examiner

*Primary Examiner*—Quoc Tran
(74) *Attorney, Agent, or Firm*—Marger Johnson & McCollom, P.C.

(57) ABSTRACT

A system and method for speaker identification in a conference calling unit. The method identifies the speaker, locates the speaker identifier, transfers the speaker identifier to an outgoing path and sends the speaker identifier to endpoints participating in the conference call. If the endpoints have the capability of displaying caller identification, their displays will be updated dynamically with the speaker identifier in place of the caller identifier. The system includes a conference call unit. The unit has a processing unit operable to extract the caller identification of the line having the speaker and a network interface unit operable to send the caller identification to endpoints participating in the call as speaker identification.

20 Claims, 2 Drawing Sheets

SYSTEM AND METHOD FOR PROVIDING SPEAKER IDENTIFICATION IN A CONFERENCE CALL

BACKGROUND OF THE INVENTION

1. Field of the Invention

This invention relates to conference calling systems and methods, more particularly to a system and method for providing more specific information about the speakers in a conference call.

2. Background of the Invention

Most users are familiar with the use of calling number display (CND) used with such phone features such as Caller ID™. In the situation where a person is calling from one single-line location, such as a house, to another single-line location, the caller's name, phone number, or both may appear on a display on the receiving person's phone. The receiving phone must have the capability of locating and translating the identification code in order to display it to the user.

In some situations, however, a more limited amount of information is made available to the receiving person. For example, a call from a multiple-line location such as a business may result in a display of the number and the business name. Similarly, when an outside call is received at a business the receiving phone may just register that it is an outside call. Typically, calls within a multiple line location use a private branch exchange (PBX) that can identify both the callers and their extension numbers for the receiving people.

Conference calls produce further complications to the identification of callers. Conference calls require a unit to make several individual connections between itself and the various participants in a call. These connections may be between people all within a company or other internal group, or a mix of inside and outside callers. The connecting device may be a PBX or a bridge, or any unit that can make the individual connections necessary to have a conference call. For ease of discussion, the connection unit will be referred to as a bridge when referring to public-switched-telephone-networks (PSTN) and integrated-services-data-networks (ISDN) and a multipoint control unit (MCU) when referring to Voice-over-Internet-Protocol (VoIP or Voice-over-Internet).

The complication arises because of the multiple connections that are made through the bridge or MCU. As an example, a current set up for a conference call of N users is shown in FIG. 1. Caller 1 10a, caller 2 10b and caller N 10c, are all connected to the central bridge to participate in the conference call. Each of the callers has a display 12a–c on their respective phones that display the calling party identification (ID). However, because the bridge 14 treats each connection as an individual call, it sends and the callers see the conference bridge name as the caller. This is less than optimal.

For example, during the course of the conference call, caller 1 speaks. Because the caller identification does not change, callers 2 and N may have to ask the caller to identify his or herself. When caller 2 then replies to caller 1, the same problem occurs. This leads to awkward and inefficient conference calls.

Therefore, there is a need for a system and method for conference calls allowing speaker identification.

SUMMARY OF THE INVENTION

One aspect of the invention is a method for providing speaker identification in a conference call. The method identifies the speaker and locates and extracts the caller identification of the speaker. The conference calling unit then assumes that caller identification and sends the associated identifier to the endpoints participating in the conference caller as a speaker ID. The method applies to PSTN, ISDN and VoIP calls.

Another aspect of the invention is a conference calling unit that locates and extracts the caller identifier of the speaker. The unit then sends that information to the endpoints participating in the conference call as a speaker identifier. The conference calling unit could be a communications card, an attachment to existing connection units, a software upgrade to present network processing equipment or new network processing equipment.

BRIEF DESCRIPTION OF THE DRAWINGS

The invention may be best understood by reading the disclosure with reference to the drawing, wherein.

DETAILED DESCRIPTION OF THE EMBODIMENTS

Figure 1:
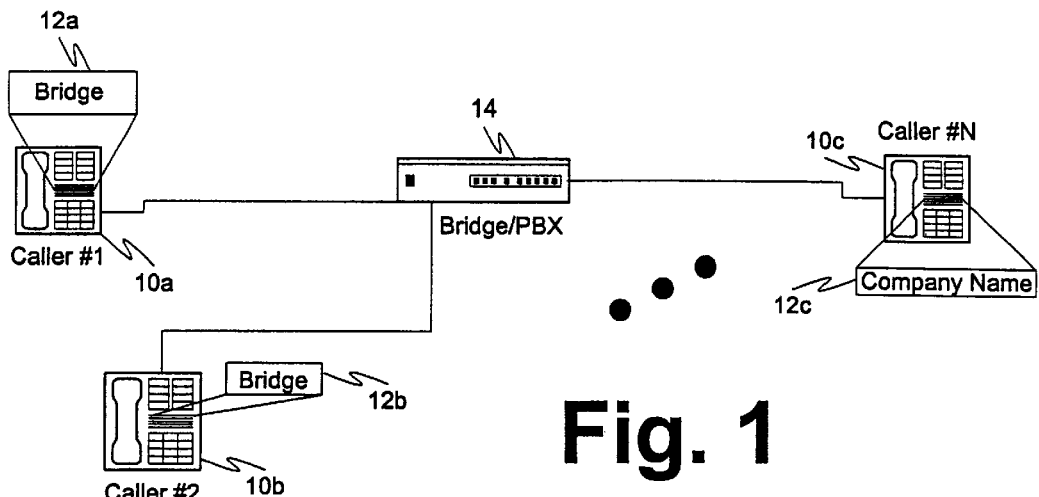
FIG. 1 shows a prior art conference calling system.

As discussed above, FIG. 1 shows a prior art embodiment of a conference calling system. The bridge or MCU 14 sends its identifier as the caller to the connecting stations.

The stations receive and display the caller identifier. Typically, the caller identification is not accessed again after the identifier has been extracted.

This is not very useful in a conference call, as there is no way to identify the speaker without interrupting the speaker and asking. The information is typically present as caller identification in the path between each station and the bridge 14. However, that information is not transferred to the other paths, so the speaker is not identified.

Figure 2:
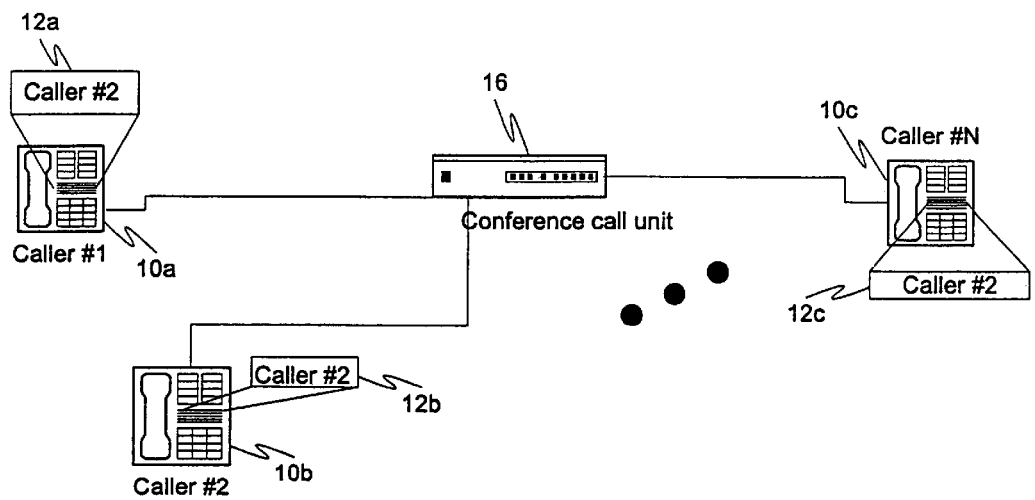
FIG. 2 shows a conference calling system in accordance with the invention.

A conference calling system that provides speaker identification is shown in FIG. 2. The conference calling unit 16 provides the identification of the speaker in a conference call to the other stations participating in the call, as can be seen by the displays 12a, 12b and 12c. In this example, caller 2 10b is the speaker. This information is relayed from the conference call unit 16 to the other stations 10a and 10c.

It must be noted that the term conference call unit as used here could be a separate unit that attaches to a current bridge or PBX, either physically or by connection. It could be contained inside current network processing device, such as an MCU, that is upgraded with new software or a different communications card. It could be a new network processing device entirely. These are only examples of the various embodiments that could contain the invention.

Figure 3:
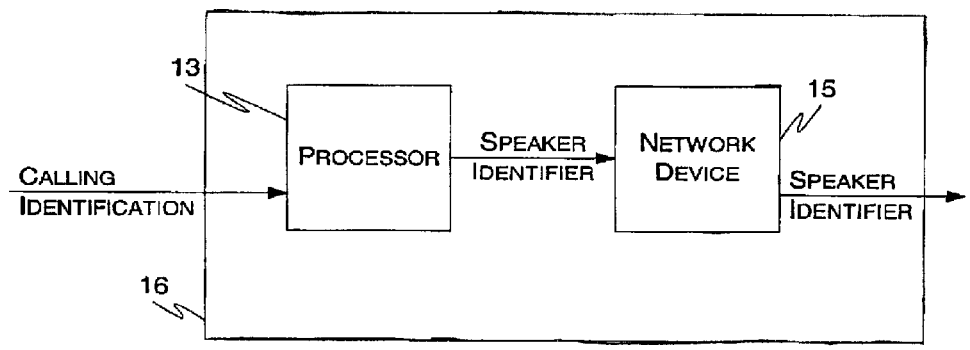
FIG. 3 shows a block diagram of a conference calling unit in accordance with the invention.

A block diagram of the conference calling unit 16, is shown in FIG. 3. The unit has two components, a processor 13 and a network device 15. The processor 13 is operable to locate and extract a speaker identifier based upon incoming caller identification information. The processor 13 then passes this information to a network device 15 operable to send the speaker identification to the endpoints of the conference call. These components could be contained in one processor, if the processor has network communication capabilities. They could also be separate components.

In the case of a software upgrade, the invention would be embodied in software and there would be code that will perform the functions. Code will perform the functions of monitoring the call for changes in the speaker, generating a speaker identifier from the user name informational element, and transmitting the speaker identifier out to the endpoints.

Figure 4:
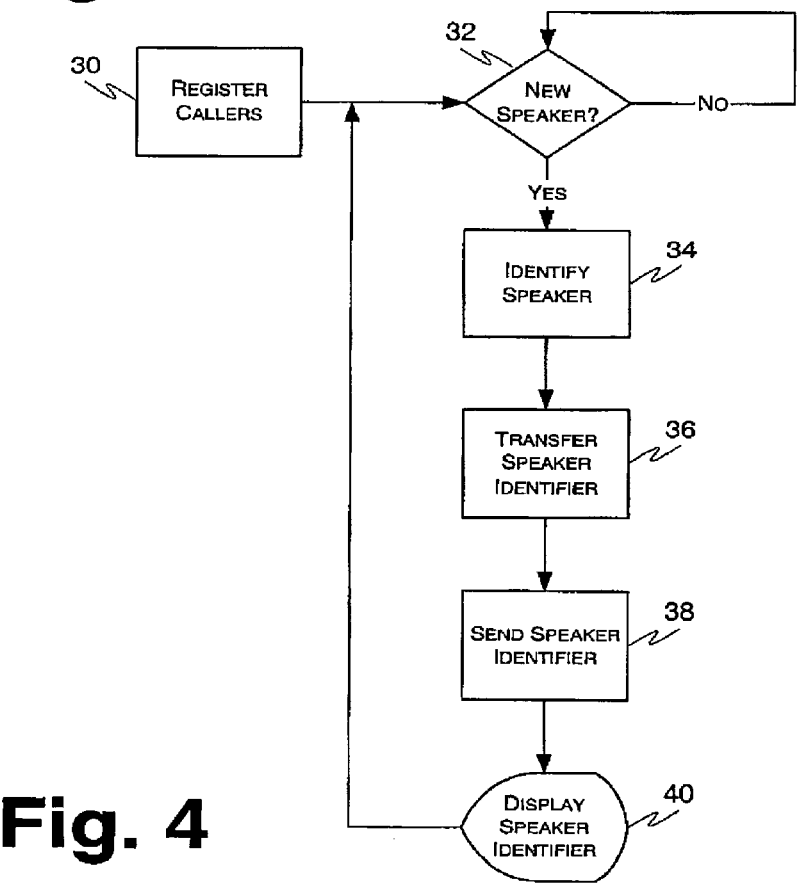
FIG. 4 shows a method for providing speaker identification in a conference call in accordance with the invention.

A method of operating the conference call unit 14 of FIG. 3 is shown in FIG. 4. Initially, the various participants in the conference call are registered in some fashion at 30. This could be accomplished in several different ways. For example, each user could speak his or her name. The name and an accompanying analysis of the speaker's vocal characteristics could be registered at the conference call unit. The spectrum of the signal coming in on each line could be monitored and an analysis performed to identify which line has the speaking caller. The specific method of registering the speakers is beyond the scope of this disclosure. The system just needs a way to identify the speaker and to locate the appropriate identifier to send to the other stations.

In another embodiment, the user ID is extracted from the caller ID field in the corresponding protocol.

Once the system has registered the users of the call, i.e., the call is set up and running, it must monitor the call for changes in the speaker, as shown at 32. As mentioned above, in current systems, once the call is connected and the initial identifier is extracted and sent, the caller identification field, or user name, is not accessed again. In this particular embodiment of the invention, the present caller identification is overridden with new information using a dynamic user name field. At 32, the system monitors this dynamic user name field throughout the call.

If a new speaker begins to speak during the call, the system will access the registry in whatever form that allows it to identify the new speaker. The speaker will then be identified at 34. The method used for the identification process can vary according to what kind of system is being used for the conference call. In general, the unit must locate and extract the caller identification for the speaker. For PSTN, or 'traditional' phone services, the caller identification data for the speaker's line must be translated. This could be done in several ways, one of which is to locate the speaker registry and access the related information, such as the line identifier for that speaker. As mentioned above, the actual method used to identify the speaker is beyond the scope of this disclosure.

For newer technologies, such as Integrated Services Data Networks (ISDN), the speaker identification must be extracted from the incoming signals. ISDN has '2B+D' or two bearer channels and one data channel. The caller identification must be located in and extracted from the data channel of the speaker's connection.

In another embodiment, the user is identified based on the voice spectrum in the corresponding bearer channel. Each person's voice will have a different spectrum signature that is unique. This can be used to identify the speaker. In one example, the central conference calling unit could perform this analysis and identification centrally and then send out the speaker identification to the endpoints in the conference call.

Alternatively, the endpoints of the call could have the necessary capability of performing the analysis and identification of the speaker. In this last example, only those participants in the call with phones capable of this analysis will see the speaker ID. It must be noted that in some cases the 'phone' is actually a personal computer or other computing device with phone features.

In another new technology called Voice-over-Internet-Protocol (VoIP or Voice-over-Internet), communications are packetized and sent to the other participants via a multipoint control unit (MCU). The name of the user is presented to the MCU in the "User Name" information element (IE) in the signaling channel.

Once the speaker identification has been made at 34 and the identifier located and extracted at 36, the information must be transferred through the conference calling unit to the outgoing paths at 38. As mentioned above, conference calling unit refers to any network device that can process the information necessary to identify the speaker and extract the caller identification of the speaker and then send it out as speaker identification (speaker ID).

For PSTN to send the speaker ID, the conference bridge or PBX would assume the caller identifier of the speaker as its identifier and send it to the endpoints participating in the conference call as the speaker identification. For VoIP, the MCU would dynamically assume the name of the speaker and then presents it in a new information element, the Dynamic User Name IE, to the other end points at 38. For a mixed system using VoIP and traditional PBXs, the system would override the User Name IE sent at call initiation with the updated information in the new Dynamic User Name IE at 38. For ISDN, the caller identification of the speaker's bearer channel must be injected into the data channel to override the caller identification with the speaker ID.

Once the speaker ID has been sent at 38, the endpoint terminals would then display the speaker ID at 40. This allows the callers at the other endpoints than the speaker to know who is talking, rather than having to interrupt to find out. This leads to more accurate, productive and useful conference calls.

It must be noted that some endpoints may not have caller identification capability, so they would not be able to identify the speaker from the speaker ID. For this reason, the final step of displaying the speaker ID is optional and not necessary for practice of the invention.

Thus, although there has been described to this point a particular embodiment for a method and structure for providing speaker identification in a conference call, it is not intended that such specific references be considered as limitations upon the scope of this invention except in-so-far as set forth in the following claims.

What is claimed is:

1. A method for providing speaker identification in a conference call, the method comprising:

receiving at least two calls from a telephone network to form a conference call at a centralized conference call control unit;

determining a first conference call control unit identifier;

identifying a speaker in the conference call at the centralized conference call control unit;

extracting speaker identifier for the speaker at the conference call control unit;

overriding the first conference call control unit identifier with the sneaker identifier; and sending the speaker identifier from the conference call control unit to endpoints participating in the conference call.

2. The method of claim 1 further comprising monitoring the conference call at the conference call control unit for changes in the speaker prior to identifying the speaker.

3. The method of claim 1 wherein extracting a speaker identifier further comprises extracting the user name information element of a public switched transmission network at the conference call control unit.

4. The method of claim 1 wherein extracting a speaker identifier further comprises extracting the user name field of a Voice over Internet packet at the conference call control unit.

5. The method of claim 1 wherein extracting the speaker identifier further comprises accessing a registry of speakers maintained by the conference call control unit.

6. The method of claim 1 wherein the conference call control unit is a public switched transmission network bridge.

7. The method of claim 1 wherein the conference call control unit is a voice over Internet multipoint control unit.

8. A conference call control unit, said unit comprising:
a processing unit operable to receive at least two calls from a network to form a conference call and locate and extract caller identification information identifying a speaker participating in a conference call; and
a network device operable to override a conference call control unit identity of the network device and send the caller identification information as the identity of the network device to endpoints participating in the conference call as speaker identification.

9. The unit of claim 8, wherein the processing unit is further to extract the caller identification from the user name identification element of a public switched transmission network.

10. The unit of claim 8, wherein the processing unit is further to extract the caller identification from a Voice-over-Internet packet.

11. The unit of claim 8, wherein the network device is further to embed the caller identification in the bearer channel of a public switched transmission network.

12. The unit of claim 8, wherein the network device is further to embed the caller identification in an outgoing packet of a voice-over-Internet transmission.

13. A method for providing speaker identification in a voice-over-internet conference call, the method comprising:
receiving at least two calls from a network at a conference call control unit;
overriding a conference call control unit identifier with a speaker identifier;
monitoring the call at a central conference call control unit for changes in the speaker;
identifying the speaker from a user name information element to determine an active speaker identifier; and
transferring the active speaker identifier through a multipoint control unit to an outgoing path.

14. The method of claim 13 further comprising receiving the active speaker identifier from the outgoing path at stations participating in the conference call and displaying the active speaker identifier at the participating stations.

15. Software for identifying an active speaker in a Voice-over-Internet conference call, the software comprising:
code for receiving at least two calls from a network at a conference call control unit;
code for overriding a conference call control unit identifier with a speaker identifier
code for monitoring the conference call at a central conference call control unit for changes in the active speaker;
code for generating an active speaker identifier in the conference call from a user name information element; and
code for transmitting the active speaker identifier to endpoints participating in the Voice-over-Internet conference call.

16. The software program according to claim 15 including code for displaying the identifier at the participating conference call endpoints.

17. A method for providing speaker identification in a voice-over-internet conference call, the method comprising:
receiving at least one two calls from a telephone network at a central conference call control unit from a network;
overriding a conference call control unit identifier with a speaker identifier;
monitoring the call at the conference call control unit for changes in the speaker;
identifying the speaker using voice spectrum analysis; and
providing an active speaker identifier based upon the voice spectrum analysis.

18. The method of claim 17, wherein the voice spectrum analysis is performed by a central unit, which provides the active speaker identifier to other stations participating in the conference call.

19. The method of claim 17, wherein the voice spectrum analysis is performed by at an endpoint of the conference call and the active speaker identifier is only provided to a display at that station.

20. The conference call control unit of claim 8, wherein the processor is to receiving the call from a network through one of a public branch exchange or a multipoint control unit.

* * * * *

UNITED STATES PATENT AND TRADEMARK OFFICE
CERTIFICATE OF CORRECTION

PATENT NO. : 6,826,159 B1
DATED : November 30, 2004
INVENTOR(S) : Shaffer et al.

It is certified that error appears in the above-identified patent and that said Letters Patent is hereby corrected as shown below:

Column 2,
Lines 33-34, replace "connecting stations. The stations receive" with -- connection stations. The stations receive --.
Line 58, replace "calling unit 16," with -- calling unit 14, --.

Column 4,
Line 59, replace "the sneaker identifier;" with -- the speaker identifier; --.

Signed and Sealed this

Seventh Day of February, 2006

JON W. DUDAS
*Director of the United States Patent and Trademark Office*